United States Patent [19]

Talley

[11] Patent Number: 6,045,852

[45] Date of Patent: Apr. 4, 2000

[54] COMPOSITION FOR CLARIFYING BEVERAGE SOLUTIONS USED TO PREPARE FERMENTED BEVERAGES

[75] Inventor: Charles Bullick Talley, Highlands Ranch, Colo.

[73] Assignee: Charvid Limited Liability Co., Commerce City, Colo.

[21] Appl. No.: 08/991,952

[22] Filed: Dec. 16, 1997

[51] Int. Cl.[7] ................................. A23L 1/05; C12C 3/08
[52] U.S. Cl. ................... 426/573; 426/590; 426/592; 426/658; 426/422
[58] Field of Search ..................... 426/590, 592, 426/422, 573, 658

[56] References Cited

U.S. PATENT DOCUMENTS

| | | | |
|---|---|---|---|
| 4,056,612 | 11/1977 | Lin . | |
| 4,299,825 | 11/1981 | Lee | 424/180 |
| 4,486,282 | 12/1984 | Bier | 204/180 |
| 4,929,452 | 5/1990 | Hamdy | 426/11 |
| 4,956,099 | 9/1990 | Thompson et al. | 210/764 |
| 5,174,903 | 12/1992 | Miller | 210/725 |
| 5,346,643 | 9/1994 | Kuno | 252/175 |
| 5,413,720 | 5/1995 | Miller | 210/725 |
| 5,474,703 | 12/1995 | Ritter | 252/181 |
| 5,543,058 | 8/1996 | Miller | 210/725 |
| 5,567,451 | 10/1996 | Rinn et al. | 426/13 |
| 5,718,161 | 2/1998 | Beadle | 99/276 |

OTHER PUBLICATIONS

First Technical Session; Daniel M. Fraser; Irish Moss—its brewing value, MBAA 76th Anniversary Convention.

Literature Regarding Carrageenan Products published by FMC.

Sacramento Bee newspaper. Sparging the Wort—Don't Try This at Home Unless Brew Pros Consulted First. Author: W. McClellan, Jul. 8, 1993.

*Primary Examiner*—Anthony J. Weier
*Attorney, Agent, or Firm*—Sheridan Ross P.C.

[57] ABSTRACT

A method and composition for clarifying a beverage solution used to prepare a fermented beverage is provided. A clarifying mixture including an organic clarifier and carbohydrate is added to the beverage solution to precipitate proteins to allow the clarifying agent to be independent of pH controls and to allow a cleaner and fresher taste after use. The addition of fruit sugars not only allows for a rapid solubility but also provides clearer and cleaner-tasting beers.

20 Claims, No Drawings

COMPOSITION FOR CLARIFYING BEVERAGE SOLUTIONS USED TO PREPARE FERMENTED BEVERAGES

FIELD OF THE INVENTION

The present invention relates to a method and composition for clarifying a beverage solution that is used to prepare a fermented beverage.

BACKGROUND OF THE INVENTION

Brewing and wine-making are ancient arts practiced centuries before the science of chemistry was born. The biochemistry of wine-making was demonstrated in 1856 by Louis Pasteur when he showed that wine is produced when the simple sugars in the fruit juices are fermented by yeast, namely *Saccharomyces cerevisiae* to yield ethanol and carbon dioxide. It is now known that alcoholic fermentation can be expressed by a series of enzyme-catalyzed biochemical reactions.

Beer is made in a similar manner by the fermentation of the carbohydrates present in cereal grains such as barley. These carbohydrates, largely polysaccharides, are not degraded by the glycolytic enzymes in yeast cells, which can only act on disaccharides and monosaccharides. To overcome this problem, the barley is "malted." In malting, the cereal seeds are allowed to germinate until they form the appropriate enzymes required to break down the polysaccharides of the cell walls as well as the starch and other polysaccharide food reserves within the cells of the seeds. Germination is then stopped by controlled heating. The malt, which now contains enzymes such as alpha amylase and maltase that are capable of breaking down the starch to maltose, glucose and other simple sugars, is formed into a "wort" by mixing the malt with water and mashing. This allows the enzymes to break down the cereal polysaccharides into the simple sugars which are soluble in the liquid medium. The remaining cell matter is then separated and the liquid wort boiled with hops to provide flavor. The liquid wort is removed from the kettle and subjected to filtration, such as by whirlpooling, to remove solid material, such as the trub-pile. The filtered liquid is then placed in a fermentor where yeast cells are added. In the presence of oxygen, the yeast cells are "activated", i.e., grow and reproduce very rapidly. Under anaerobic conditions, the yeast ferments the sugars into ethanol and carbon dioxide. After the fermentation has been stopped, the cells are removed and the raw beer is ready for final processing (e.g., adjustment of the amount of "head", $CO_2$ concentration, concentration of flavorings, etc).

Carrageenan is added to the wort to improve beer clarification by removing suspended proteins in the trub pile. The addition of carrageenan to the wort also provides other advantages including the formation of a denser cold break (i.e., after fermentation), and shortened fermentation time.

The use of carrageenan in wort clarification can have drawbacks. Carrageenan can have very limited solubility in hot wort. Thus, carrageenan often balls-up when added to hot wort and forms "fish eyes", i.e., clumps of carrageenan and/or protein residues. Furthermore, this clarification process can make a mess in the kettle by creating large balls and gumming up the inside of the kettle. The carrageenan, due to the limited solubility, is not effectively removed in the filtration step and can contribute to the formation of a Krausen ring during fermentation. This clarification process can also result in more gelatinous hot wort break (i.e., when the wort is removed from the kettle). The gelatinous hot wort break in turn results in higher loss of wort in the hot trub and/or a denser cold break which reduces the speed of filtration of the cold wort when carrageenan is added. In addition, because the trub-pile that is formed by the current method is gelatinous, it tends to clog up a filter and reduce the life of a filter.

Therefore, there is a need for a method for clarifying beer that retains all the advantages of the current method but also provides tighter trub-pile formation to facilitate filtration, reduce the amount of wort loss, and to increase the life of a filter.

SUMMARY OF THE INVENTION

The present invention relates to clarifying a beverage solution used to prepare a fermented beverage using a clarifying mixture that is soluble in hot wort. The clarifying mixture of the present invention does not produce a gummy Krausen ring in the fermentors nor does it create a mess by gumming up the inside of the kettle. In addition, the resulting protein precipitate is more tightly packed leading to less wort loss and faster filtration.

In one embodiment of the invention, a clarifying mixture comprising an organic clarifier and a carbohydrate is added to a beverage solution containing a protein to precipitate the protein. The precipitated protein is then removed from the beverage solution.

The clarifying mixture of the present invention is preferably comprised of at least about 30% by weight organic clarifier. The organic clarifier is desirably selected from the group consisting of carrageenan, gelatin, hydrolyzed proteins, and a mixture thereof. Most desirably, the organic clarifier comprises at least about 25% by weight of λ-carrageenan and at least about 40% by weight κ-carrageenan. Preferably, at least about 80% of organic clarifier of the present invention has the particle size of from about 100 mesh to about 50 mesh (U.S. Std.).

To allow the solubility of the clarifying mixture in the beverage to be substantially independent of pH, the clarifying mixture can also include a carbohydrate which is selected from he group consisting of fructose, sucrose, corn sugar, simple sugars, and a mixture thereof. Preferably, the carbohydrate is fructose or sucrose with fructose being most preferred. The addition of fruit sugars not only allows for a rapid solubility but also provides clearer and cleaner-tasting beverages.

In another embodiment of the present invention, the wort used to prepare beer is clarified by adding at least about 1 oz of a clarifying mixture to about 10 barrels of wort. The clarifying mixture comprises an organic clarifier that preferably includes from about 25 wt % to about 50 wt % λ-carrageenan and from about 40 wt % to about 75 wt % κ-carrageenan. The clarifying mixture is added at about last 5 to about 10 minutes of wort boiling to precipitate proteins present in the wort. The precipitated proteins are removed prior to subjecting the wort to a fermentation step to produce beer.

DETAILED DESCRIPTION OF THE INVENTION

The present invention provides a method and composition for clarifying a beverage solution used to prepare a fermented beverage. As used in this invention a "beverage solution" is an unfermented solution that is used to produce a fermented beverage. Exemplary beverage solutions include malt, wort, crushed fruit, fruit juice, crushed grain, grain solution and other precursor solutions to alcohol. A "fermented beverage" refers to a liquid drink which is derived by enzymatically or cellularly controlled transformation of an organic compound. Exemplary fermented beverages include beer, wine, and other alcohols such as cordials and spirits.

In one embodiment of the present invention, a beverage solution is clarified by adding a clarifying mixture comprising an organic clarifier and a carbohydrate to precipitate a protein from the beverage solution. The beverage solution can be filtered to remove the precipitated protein prior to being fermented at a condition sufficient to produce a fermented beverage. Without being bound by any theory, it is believed that the addition of a clarifying mixture results in binding of the protein to the organic clarifier. As used in this invention, "binding" refers to bonding of the protein with the organic clarifier. This binding can be the result of covalent bonding, ionic bonding, hydrogen bonding, Van der Waal's force, or any combination thereof.

The use of the clarifying mixture of the present invention results in about 3 times faster protein precipitation than currently known methods. In addition to faster protein precipitation, the protein is also more tightly bound to the organic clarifier resulting in at least about 1.6% less loss of beverage solution than currently known methods, more preferably at least about 3%, and most preferably at least about 6%. Formation of tightly bound protein precipitates has the added benefit of providing longer filter life because it does not clog-up the filter as much as non-tightly bound protein precipitates. It has been found that using a method of the present invention can prolong the usefulness of a filter about twice as long as currently used clarifying methods. In addition, formation of a tightly bound precipitate provides easier and faster filtration by reducing the amount of clogging in a filter.

An organic clarifier refers to any compound which facilitates precipitation (i.e., removal) of proteins that are present in the beverage solution. As stated above, the removal of proteins can be a result of binding of the protein by the organic clarifier. Preferably, an organic clarifier is selected from the group consisting of carrageenan, gelatin, hydrolyzed proteins, and a mixture thereof.

Carrageenan is a generic term for hydrocolloids extracted from seaweeds such as Irish Moss (*Chondrus Crispus*) which yields kappa and lambda carrageenan, Eucheuma species which yields carrageenan kappa and iota carrageenan, and Gigartina species which yields kappa and lambda carrageenan. Carrageenan is a high molecular weight linear polysaccharide made up almost entirely of repeating galactose units and anhydrogalactose units, both sulfated and nonsulfated. There are several different types of naturally occurring carrageenan such as kappa ($\kappa$), iota ($\iota$) and lambda ($\lambda$). Each of these types of carrageenan has different properties as disclosed on page 4 of Carrageenan Marine Colloids published by Marine Colloids Division of FMC Corporation, which is incorporated herein in its entirety. In addition to naturally occurring carrageenan, synthetically synthesized or chemically modified carrageenan can also be used as an organic clarifier for the present invention. Furthermore, any polysaccharide or its derivatives which exhibit similar gel formation property as that of carrageenan can also be used as an organic clarifier. As used in this invention, a polysaccharide refers to a complex carbohydrate having average molecular weight of preferably at least about 114,000 g/mole, and, more preferably, at least about 200,000 g/mole, and most preferably ranging from about 250,000 to about 400,000 g/mole. Exemplary polysaccharides include cellulose, pectin, starch and glycogen.

In addition to polysaccharides, any compound that binds with protein and forms a precipitate or other non-soluble material can be used as an organic clarifier. For example, proteins can form a precipitate comprising $\beta$-sheet, double and/or triple helix and other macromolecule structures when combined with other proteins. Therefore, a heterogeneous mixture of water-soluble proteins having high average molecular weight such as gelatin can also be used as an organic clarifier.

A texture of the precipitated proteins can be varied by blending different amount of organic clarifiers. For example, although either $\kappa$-carrageenan or $\lambda$-carrageenan alone can be used as an organic clarifier in the present invention, it has been found that an organic clarifier having various amounts of $\lambda$-carrageenan in addition to $\kappa$-carrageenan results in faster and/or tighter protein precipitation. Preferably an organic clarifier comprises at least about 5 wt % $\lambda$-carrageenan, more preferably at least about 25 wt %, and most preferably at least about 30 wt % and preferably no more than about 60 wt %, more preferably no more than about 50 wt %, and most preferably no more than about 45 wt % $\lambda$-carrageenan. Alternatively, an organic clarifier comprises at least about 30 wt % $\kappa$-carrageenan, more preferably at least about 40 wt %, and most preferably at least about 50 wt % and preferably no more than about 95 wt %, more preferably no more than about 80 wt %, and most preferably no more than about 75 wt % $\kappa$-carrageenan. As used in this invention, "tighter" refers to precipitates having more solid-like character and/or appearance (i.e., more compact) than gel-like character and/or appearance.

It has been found that when the particle size of an organic clarifier is too small, it tends to form clumps rather than being relatively uniformly hydrated or dissolved in the beverage solution. Formation of organic clarifier clumps in the beverage solution can be reduced by selecting an organic clarifier where at least about 20% of the organic clarifier has the particle size of from about 100 mesh to about 50 mesh (U.S. Standard), more preferably at least about 50%, and most preferably at least about 80%.

In addition to an organic clarifier, the clarifying mixture also comprises a carbohydrate. As used in the present invention, a carbohydrate is a sugar molecule or its derivative. A carbohydrate can be a monosaccharide or an oligosaccharide having average molecular weight of less than about 364 g/mole. Exemplary carbohydrates include glucose, fructose, maltose, lactose, mannose, sorbose, ribose, xylose, rhamnose, galactose, talose, arabinose, gulose, and sucrose. Preferably, carbohydrate is selected from the group consisting of fructose, sucrose, corn sugar (i.e., dextrose), a simple sugar, and a mixture thereof. As used in this invention, a simple sugar refers to a carbohydrate as defined above.

Without being bound by a theory, it is believed that a carbohydrate helps facilitate solubilizing an organic clarifier in water or in a beverage solution. A proper ratio of organic clarifier to carbohydrate helps to facilitate solubilize organic clarifier which promotes precipitation of proteins present in the beverage solution. Preferably clarifying mixture comprises at least about 30 wt % organic clarifier, more preferably at least about 35 wt % and most preferably at least about 40 wt % but preferably no more than about 50 wt % and most preferably no more than about 45 wt % organic clarifier. Alternatively, a clarifying mixture comprises at least about 20 wt % carbohydrate, more preferably at least about 25 wt %, and most preferably at least about 30 wt % but preferably no more than about 80 wt % and more preferably no more than about 70 wt % carbohydrate.

Preferably the molar ratio of an organic clarifier to a carbohydrate is from about 1:500 to about 1:10,000 more preferably from about 1:600 to about 1:8,000, and most preferably from about 1:1,000 to about 1:3,000.

The clarifying mixture can be added directly to a beverage solution or more preferably, it is added to a beverage solution as a solution in a solvent (i.e., preferably cold or hot water). When the clarifying mixture is added as a solution, about 1 oz of a clarifying mixture is dissolved in from about 100 mL to about 600 mL of solvent prior to being added to a beverage solution, more preferably in from about 200 mL to about 400 mL of solvent, and most preferably in about 300 mL of solvent. Preferably the solvent is water that is at ambient temperature.

In the absence of a carbohydrate, the pH of the solvent can be an important contributor to the degree of solubility of the carrageenan in the solvent. As will be appreciated, it is desirable to have as high a degree of solubility of the carrageenan in the solvent as possible prior to the addition of the clarifying mixture to the beverage solution. Preferably, the solvent has a pH ranging from about pH 6 to about pH 10, more preferably from about pH 6.5 to about pH 10, and most preferably from about pH 7 to about pH 10.

In the presence of a carbohydrate that is soluble in the solvent, it has been surprisingly and unexpectedly discovered that pH is no longer an important factor to the solubility of the carrageenan in the solvent and/or the wort. While not wishing to be bound by any theory, it is believed that the addition of carbohydrates, such as simple sugars, especially fructose which is readily soluble in water, increases the viscosity of the solvent and thereby retards the wetting ability of the solvent and allows the carrageenan to swell at a slower rate (thus increasing the solubility of the carrageenan in the solvent). In the absence of sugar, the addition of the clarifying mixture to the wort (which has a pH of less than 6) causes the carrageenan to be substantially insoluble in the wort (which greatly decreases the effectiveness of the carrageenan in reacting with proteins).

Because contact with oxidizing or reducing agents such as oxygen, peroxides, hypochlorites or sulfites can destroy the physical properties of carrageenan and its extracts in a matter of minutes, it is further desirable that the clarifying mixture (and solvent) be substantially free of oxidizing and reducing agents.

The amount of clarifying mixture necessary to clarify a beverage solution can vary depending upon the amount of proteins present in the beverage solution, which can depend on the nature of the fermented beverage. In a typical beer making process, at least about 0.5 oz. of a clarifying mixture is added to about 10 barrels of wort, more preferably at least about 0.75 oz., and most preferably at least about 1 oz. Generally, a clarifying mixture is added to a wort in the last 5 to about 10 minutes of boiling. Alternatively, a clarifying mixture can be added to a wort which has ceased boiling but is at a temperature of at least about 90° C., more preferably at least about 95° C., and most preferably at least about 98° C. When the clarifying mixture is added as an aqueous solution, about 1 oz of a clarifying mixture is dissolved in about 300 mL of water. Water is generally at room temperature.

EXPERIMENTAL

A series of tests were performed to analyze the ability of the clarifying mixture of the present invention to remove proteinaceous materials from beer. Test batches were all-grain single infusion mash. The original gravity was 1.050 on all 11 test batches. The color of the finished beer in each of the text batches was 11 on the ASBC haze units scale. The calculated IBU's were 35. All pellet hops were used. The test batches were chosen to simulate an average all-grain American Pale Ale as produced in most micro breweries and brew pubs. Mash was for 90 minutes at 152° F. Boil was for 110 minutes with hops added at 90, 60, 30 and 5 minutes before the end of the boil. The kettle coagulant was rehydrated for 15 minutes in 8 ounces of cool water before being added to the boiling wort for the last 15 minutes of the boil. At the end of the boil, a one-liter sample was taken and force-cooled for 24 hours to obtain turbidity. The wort in the kettle was then whirlpooled for 15 minutes. It was then transferred to the fermentor being cooled in line. The flow was stopped when the trub pile was observed flowing into the outset of the kettle. The trub pile was then observed and photographed. The volume of the fermenter fill was then recorded. The experimental results are as follows:

| SOLUBILIZER CONCENTRATION | CARRAGEENAN CONCENTRATION | TRUB PILE | WORT TURBIDITY | WORT CLARITY | GALLONS TO FERMENTER |
|---|---|---|---|---|---|
| 0 | 0 | EXTREMELY LOOSE | 400–500 | HAZY | 4.8 |
| 10 PPM FRUCTOSE | 10 PPM KAPPA | VERY LOOSE | 150–200 | CLEAR | 5 |
| 20 PPM FRUCTOSE | 20 PPM KAPPA | SLIGHTLY LOOSE | 125–175 | CLEAR | 5.25 |
| 30 PPM FRUCTOSE | 30 PPM KAPPA | TIGHT | 100–125 | CLEAR | 5.5 |
| 10 PPM SUCROSE | 10 PPM KAPPA | VERY LOOSE | 175–225 | SLIGHT HAZE | 5 |
| 20 PPM SUCROSE | 20 PPM KAPPA | SLIGHTLY LOOSE | 150–200 | SLIGHT HAZE | 5.1 |
| 30 PPM SUCROSE | 30 PPM KAPPA | TIGHT | 125–150 | SLIGHT HAZE | 5.5 |
| 10 PPM NaHCO$_3$ | 10 PPM KAPPA | SLIGHTLY LOOSE | 150–200 | HAZY | 5.25 |
| 20 PPM NaHCO$_3$ | 20 PPM KAPPA | TIGHT | 125–150 | HAZY | 5.5 |
| 30 PPM NaHCO$_3$ | 30 PPM KAPPA | VERY TIGHT | 100–125 | HAZY | 5.5 |
| 10 PPM FRUCTOSE | 10 PPM 50% KAPPA: 50% LAMBDA | SLIGHTLY LOOSE | 150–200 | CLEAR | 5.25 |
| 20 PPM FRUCTOSE | 20 PPM 50% KAPPA: 50% LAMBDA | TIGHT | 125–150 | CLEAR | 5.5 |
| 30 PPM FRUCTOSE | 30 PPM 50% KAPPA: 50% LAMBDA | TIGHT | 100–125 | CLEAR | 5.5 |

The beers were then fermented, aerated with pure oxygen, and then the yeast (the yeast is sold under the tradename "WHITE LABS CALIFORNIA ALE YEAST") was pitched. Fermentation was underway within 8 hours and continued at 60 to 64° F. After racking into secondary, the beers were observed to clarify within 48 hours. Only f our of the beers were in secondary at the conclusion of the experiment while the rest were still fermenting. The DeClerk test was used to evaluate the various brews made with the clarifying mixture. The test was fairly severe: 5 days at 140° F. then 2 days at 32° F. and finally warmed up to 50° F. The results are as follows:

| BATCH | ASBC HAZE UNITS |
|---|---|
| Control (no I.M.) | 400–500 |
| Powdered I.M. | 100–150 |
| Refined Flake I.M. | 150–200 |
| Large Flake I.M. | 17–200 |

The clarifying mixtures containing fructose and, to a lesser extent, sucrose were observed to solubilize extremely easily and provide a wort of a relatively high clarity. Clarifying mixtures containing fructose were observed to dissolve the fastest and provide the highest wort clarity. Compared to conventional carrageenan additives, the clarifying mixtures were highly soluble in the wort. Typically the clarifying mixture rehydrated within 30 seconds while the conventional carrageenan additive required the entire 15 minutes and even at that point 5 to 10% of the volume was still in powder form. Fifteen percent of the total volume was in the form of hard clumps which could contribute to increased material in the fermenter and cause problems trying to remove the material deposited along the Krausen ring in the fermenter. In conclusion, the clarifying mixture was highly effective in removing proteinaceous material from the wort.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A composition for clarifying a beverage solution used to prepare a fermented beverage comprising carrageenan and a carbohydrate.

2. The composition of claim 1, wherein said carrageenan comprises κ-carrageenan and λ-carrageenan.

3. The composition of claim 1, wherein said carrageenan comprises at least about 5 wt % λ-carrageenan.

4. The composition of claim 1, wherein said carrageenan comprises at least about 35 wt % of said composition.

5. The composition of claim 1, wherein at least about 80% of said carrageenan has a particle size of from about 100 mesh to about 50 mesh (U.S. Std.).

6. The composition of claim 1, wherein said carbohydrate comprises at least about 20 wt % of said composition.

7. The composition of any one of claims 1, 2, 3, 4, 5 or 6, wherein said carbohydrate is selected from the group consisting of fructose, sucrose, corn sugar, and mixture thereof.

8. The composition of claim 1, wherein said carbohydrate is fructose.

9. The composition of claim 1, wherein said carbohydrate is sucrose.

10. The composition of claim 1, wherein a molar ratio of the carrageenan to the carbohydrate ranges from about 1:500 to about 1:10,000.

11. The composition of claim 2, wherein from about 40 to about 75% by weight of the carrageenan is κ-carrageenan and from about 25 to about 50% by weight of the carrageenan is λ-carrageenan.

12. A composition for clarifying a beverage solution, comprising:

(a) κ-carrageenan;

(b) λ-carrageenan; and (c) a carbohydrate.

13. The composition of claim 12, wherein at least about 25% by weight of the carrageenan is λ-carrageenan.

14. The composition of claim 12, wherein at least about 40% by weight of the carrageenan is κ-carrageenan.

15. The composition of claim 12, wherein at least about 50% of the carrageenan has a particle size of from about 100 mesh to about 50 mesh (U.S. Std.).

16. The composition of claim 12, wherein carrageenan constitutes at least about 35% by weight of the composition.

17. The composition of any one of claims 12, 13, 14, 15 or 16, wherein the carbohydrate is selected from the group consisting of fructose, sucrose, corn sugar, corn sugar derivatives other than fructose and sucrose, and mixtures thereof.

18. A composition for clarifying a beverage solution, comprising carrageenan, wherein (a) from about 40 to about 75% by weight of the carrageenan is κ-carrageenan;

(b) from about 25 to about 50% by weight of the carrageenan is λ-carrageenan; and (c) a carbohydrate selected from the group consisting of fructose, sucrose, glucose, and mixtures thereof.

19. The composition of claim 18, wherein the carbohydrate comprises at least about 20 wt % of the composition.

20. The composition of claim 18, wherein the carrageenan constitutes at least about 35% by weight of the composition and the beverage solution has a pH ranging from about pH 6 to about pH 10.

* * * * *